US012746584B2

(12) United States Patent
Winkler et al.

(10) Patent No.: US 12,746,584 B2
(45) Date of Patent: Sep. 29, 2026

(54) METHODS AND APPARATUS FOR CLEANING A VESSEL

(71) Applicant: ASM IP Holding B.V., Almere (NL)

(72) Inventors: Jereld Lee Winkler, Gilbert, AZ (US); Paul Ma, Scottsdale, AZ (US); Eric James Shero, Phoenix, AZ (US); Shubham Garg, Tempe, AZ (US); Jonathan Bakke, Phoenix, AZ (US); Todd Dunn, Cave Creek, AZ (US); Jacqueline Wrench, Mesa, AZ (US); Shuaidi Zhang, Chandler, AZ (US)

(73) Assignee: ASM IP Holding B.V., Versterkerstraat (NL)

( * ) Notice: Subject to any disclaimer, the term of this patent is extended or adjusted under 35 U.S.C. 154(b) by 0 days.

(21) Appl. No.: 19/360,474

(22) Filed: Oct. 16, 2025

(65) Prior Publication Data

US 2026/0042130 A1 Feb. 12, 2026

Related U.S. Application Data

(62) Division of application No. 18/509,375, filed on Nov. 15, 2023, now Pat. No. 12,472,539.

(60) Provisional application No. 63/426,433, filed on Nov. 18, 2022.

(51) Int. Cl.
*B08B 9/08* (2006.01)
*B08B 9/46* (2006.01)

(52) U.S. Cl.
CPC .............. *B08B 9/0813* (2013.01); *B08B 9/46* (2013.01); *B08B 2209/08* (2013.01)

(58) Field of Classification Search
CPC ...... B08B 9/0813; B08B 9/46; B08B 2209/08
USPC .......................................................... 134/198
See application file for complete search history.

(56) References Cited

U.S. PATENT DOCUMENTS

2003/0121171 A1* 7/2003 Chou ........................ B08B 7/00 34/406
2016/0318076 A1* 11/2016 Haas ........................ B08B 5/04
2022/0074864 A1* 3/2022 Keinan .................. G01N 15/06

* cited by examiner

*Primary Examiner* — Tinsae B Ayalew
(74) *Attorney, Agent, or Firm* — Snell & Wilmer L.L.P.

(57) ABSTRACT

Various embodiments of the present technology may provide methods and apparatus for cleaning a source vessel. The source vessel may be filled or partially filled with a solvent to form a solution. The solution is removed from the source vessel and contained in a waste vessel that is connected to the source vessel. The waste vessel may have a bellow or other mechanism inside of it to create a negative pressure in the waste vessel to pull the solution out of the source vessel and into the waste vessel. Alternatively, a liquid pump may be used to pull the solution from the source vessel to the waste vessel.

18 Claims, 4 Drawing Sheets

METHODS AND APPARATUS FOR CLEANING A VESSEL

CROSS-REFERENCE TO RELATED APPLICATIONS

Figure 1:
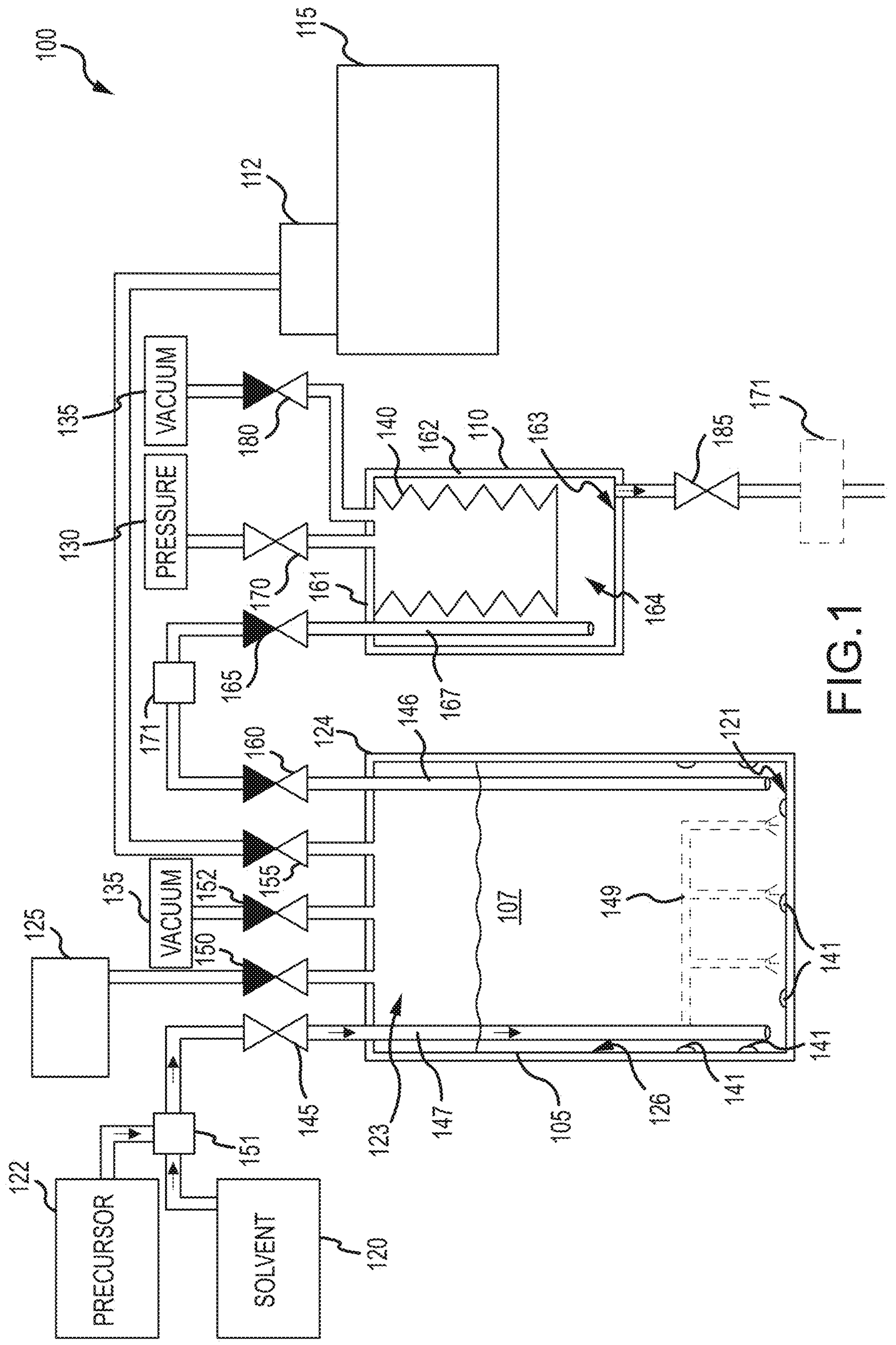

This application is a divisional of, and claims priority to and the benefit of, U.S. patent application Ser. No. 18/509,375, filed Nov. 15, 2023 and entitled "METHODS AND APPARATUS FOR CLEANING A VESSEL," which is a nonprovisional of, and claims priority to and the benefit of, U.S. Provisional Patent Application No. 63/426,433, filed Nov. 18, 2022 and entitled "METHODS AND APPARATUS FOR CLEANING A VESSEL," all of which are hereby incorporated by reference herein.

FIELD OF INVENTION

The present disclosure generally relates to methods and apparatus for cleaning a vessel. More particularly, the present disclosure relates to cleaning a source vessel, which holds chemicals and is used during the fabrication of semiconductor devices, using a solvent and an accompanying waste vessel.

BACKGROUND OF THE TECHNOLOGY

Vessels are used to contain and deliver various chemistries to a semiconductor manufacturing tool during the semiconductor manufacturing process. Many of these vessels are periodically refilled during the manufacturing process and/or while still connected to the tool. Over time, however, a buildup of impurities, such as partially decomposed or partially reacted chemistries, may occur in these vessels. Buildup of impurities in the vessel can result in dose variation or defect issues, which requires the vessel to be removed from the tool and replaced, during which time, the semiconductor manufacturing tool is shut down and inoperable.

SUMMARY OF THE INVENTION

Various embodiments of the present technology may provide methods and apparatus for cleaning a source vessel. The source vessel may be filled or partially filled with a solvent to form a solution. The solution is removed from the source vessel and contained in a waste vessel that is connected to the source vessel. The waste vessel may have a bellow or other mechanism inside of it to create a negative pressure in the waste vessel to pull the solution out of the source vessel and into the waste vessel. Alternatively, a liquid pump may be used to pull the solution from the source vessel to the waste vessel.

According to one aspect, an apparatus comprises a first vessel, comprising: an interior volume defined by sidewalls, a top surface, and a bottom surface, wherein the sidewalls extend upwards from the bottom surface to the top surface; a first inlet port disposed at the first surface; a first inlet tube connected to first inlet, wherein the inlet tube extends into the interior volume of the first vessel; and a first outlet tube extending from the top surface towards the bottom surface; and a second vessel, comprising: an interior volume defined by sidewalls, a top surface, and a bottom surface; a mechanism disposed within the interior volume of the second vessel and configured to expand and contract; a second inlet tube connected to the first outlet tube; a third inlet port configured to flow air into the mechanism; and a second outlet port disposed at the bottom surface of the second vessel.

In an embodiment of the above apparatus, the first inlet tube is configured to deliver a liquid to the interior volume of the first vessel.

In an embodiment of the above apparatus, the apparatus further comprises a heating element disposed on an external surface of the first vessel and configured to maintain the first vessel at a first temperature.

In an embodiment of the above apparatus, the apparatus further comprises a solid particle counter disposed between the first outlet tube and the second inlet tube.

In an embodiment of the above apparatus, the first inlet tube further comprises a plurality of nozzles pointing toward the bottom surface of the first vessel.

In an embodiment of the above apparatus, the apparatus further comprises a sensor disposed in the interior volume of the first vessel and configured to detect a liquid.

In an embodiment of the above apparatus, the interior volume of the second vessel is connected to the interior volume of the first vessel via the first outlet port and the second inlet tube.

In an embodiment of the above apparatus, the first vessel further comprises a first outlet port disposed outside the interior volume of the first vessel and on the top surface, wherein the first outlet port is connected to the first outlet tube.

In an embodiment of the above apparatus, the first inlet port comprises a first valve and the first outlet port comprises a second valve.

In an embodiment of the above apparatus, the second outlet port is disposed outside of the interior volume of the second vessel and comprises a third valve.

According to another aspect, a method for cleaning a source vessel containing a solute comprises: flowing a solvent into the source vessel via a first inlet tube; filling the source vessel with the solvent to a predetermined level; forming a solution from the solvent and solute; providing a waste vessel connected to the source vessel; flowing the solution from the source vessel to the waste vessel, comprising generating a negative pressure in the waste vessel; and draining the solution from the waste vessel.

In an embodiment of the above method, the method further comprises detecting particles in the solution.

In an embodiment of the above method, generating the negative pressure in the waste vessel comprises compressing a bellow disposed inside of the waste vessel via a vacuum source.

In an embodiment of the above method, draining the solution from the waste vessel comprises expanding the bellow by pressurizing the bellow.

In an embodiment of the above method, the method further comprises drying the source vessel comprising heating the source vessel and evacuating air in the source vessel.

In an embodiment of the above method, the method further comprises maintaining the source vessel at a first temperature; and maintaining the waste vessel at a second temperature, wherein the second temperature is less than the first temperature.

In an embodiment of the above method, the method further comprises introducing a fluorine radical into the source vessel prior to flowing the solvent into the source vessel.

According to yet another aspect, an apparatus comprises a first vessel, comprising: an interior volume defined by sidewalls, a top surface, and a bottom surface, wherein the sidewalls extend upwards from the bottom surface to the top surface; a first inlet port disposed at the first surface, and comprising a first valve; a first inlet tube connected to first inlet, wherein the inlet tube extends into the interior volume of the first vessel; a first outlet tube extending from the top surface towards the bottom surface; and a first outlet port disposed outside the interior volume of the first vessel and on the top surface, wherein the first outlet port is connected to the first outlet tube and comprises a second valve; a second vessel, comprising: an interior volume defined by sidewalls, a top surface, and a bottom surface; a second inlet tube connected to the first outlet tube via the first outlet port; a second outlet port comprising a third valve; a third outlet port fluidly connected to the interior volume of the second vessel and disposed at the bottom surface of the second vessel, and comprising a fourth valve; a vacuum pump connected to the third valve; and a liquid pump fluidly connected downstream of the fourth valve.

In an embodiment of the above apparatus, the apparatus further comprises a solid particle counter disposed between the first outlet port and the second inlet tube.

In an embodiment of the above apparatus, the first inlet tube further comprises a plurality of nozzles pointing toward the bottom surface of the first vessel.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 2:
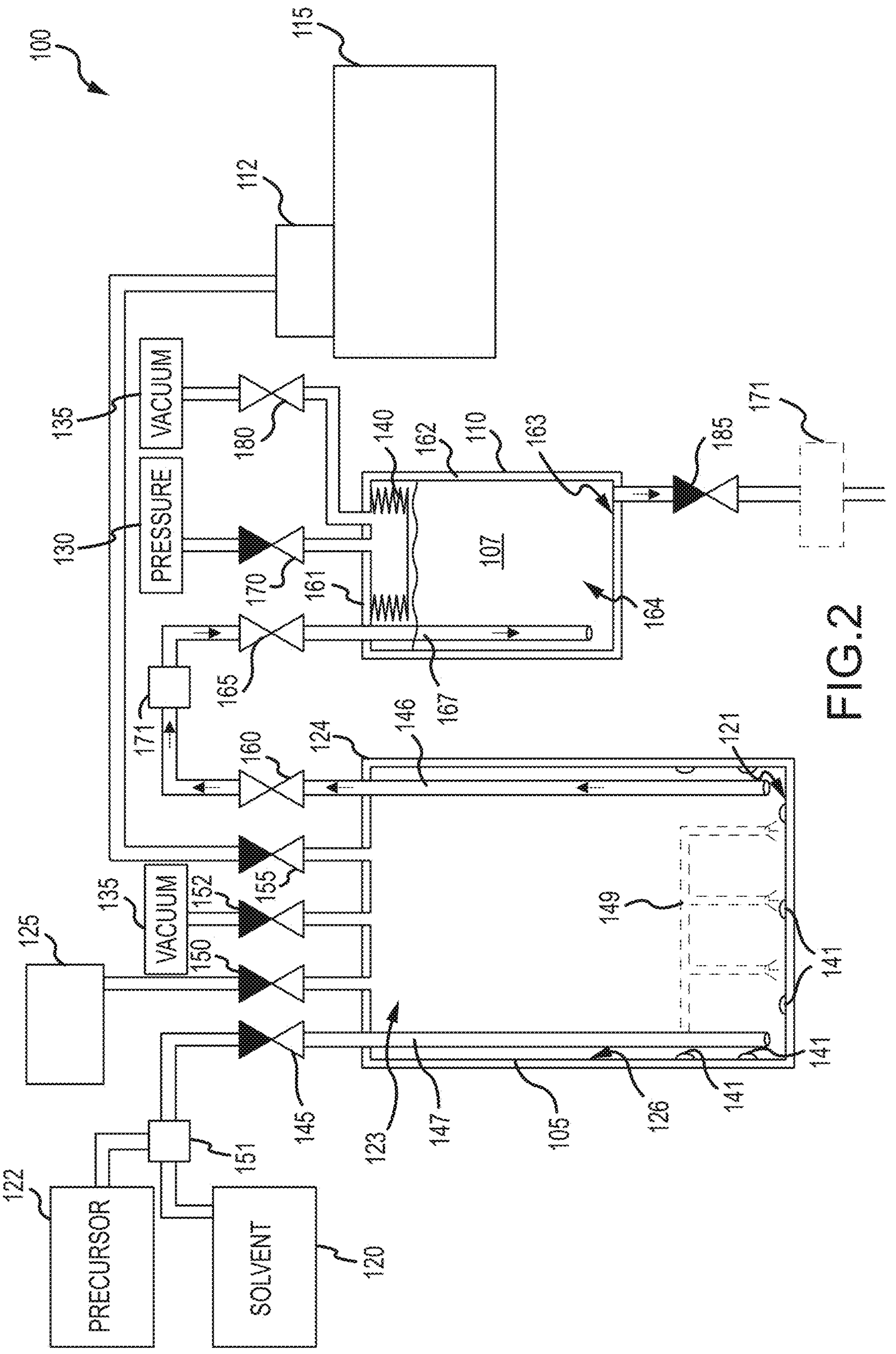
Figure 3:
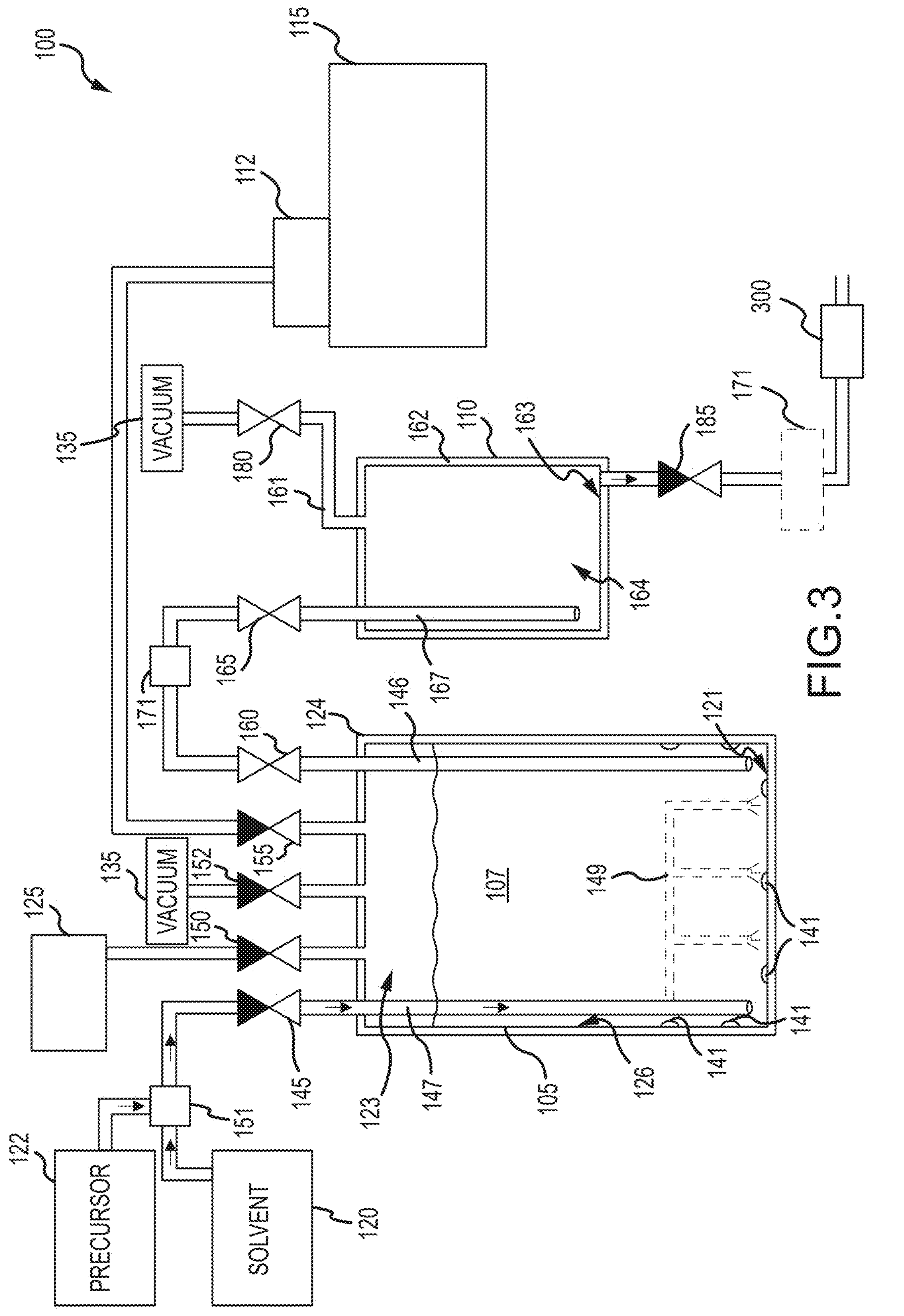
Figure 4:
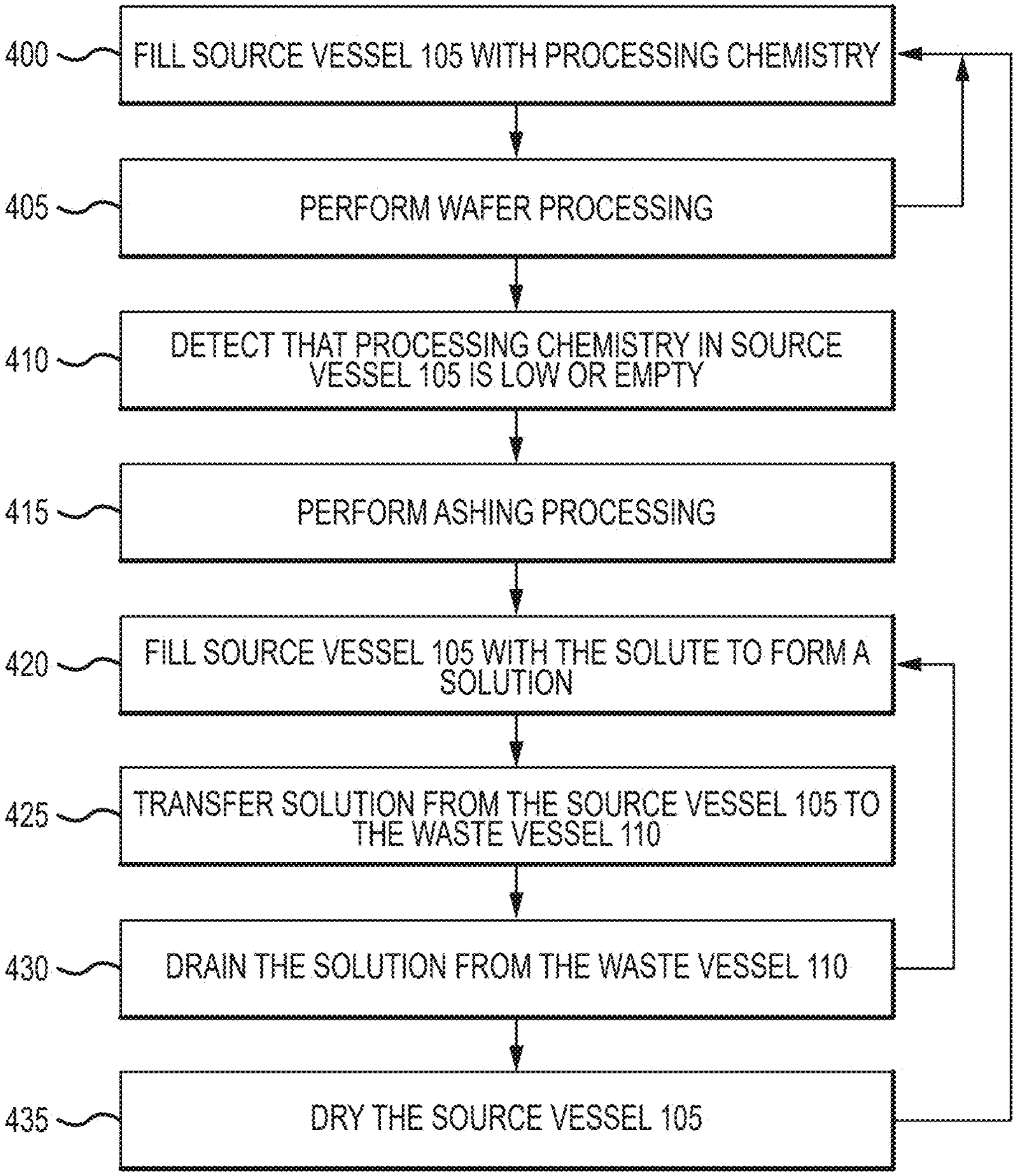

FIG. 1 representatively illustrates a system in accordance with an exemplary embodiment of the present technology;

FIG. 2 representatively illustrates the system in accordance with an exemplary embodiment of the present technology;

FIG. 3 representatively illustrates the system in accordance with an exemplary embodiment of the present technology; and FIG. 4 is a method for operating the system in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various valves, pumps, reaction chambers, and vessels.

Referring to FIGS. 1 and 2, an exemplary system 100 may comprise a reaction chamber 115 for processing a substrate, such as a wafer (not shown). The reaction chamber 115 may comprise a processing chamber (not shown) and a showerhead assembly (not shown). The processing chamber may comprise an interior space configured for processing the wafer. For example, the processing chamber may be equipped with exhaust ducts, heating elements, sensors, and the like, to achieve a desired temperature, pressure, conductance, and the like.

The showerhead assembly may comprise a plurality of through-holes (not shown) configured to flow precursors and/or reactants toward the wafer. Accordingly, the showerhead assembly may be positioned above the wafer and the processing chamber.

The system 100 may further comprise a susceptor (not shown) disposed within the interior space of the processing chamber and configured to support the wafer. The susceptor may be supported by a pedestal (not shown). In various embodiments, the susceptor may be configured to move up and down along a z-axis (Z), for example from a first position to a second position. In other cases, the susceptor may remain stationary.

In various embodiments, the susceptor may be formed from ceramic (alumina, AlOx), or a metal (e.g., a metallic material such as stainless steel, Hastelloy, or the like). The susceptor may comprise a top surface that is horizontally-oriented and positioned directly below the showerhead assembly. The wafer (or other substrate) may rest on the top surface of the susceptor during processing.

The susceptor may comprise a heating element (not shown) configured to heat the wafer to any desirable temperature during processing. The heating element may comprise any suitable heating element and may be arranged in any desired shape or pattern. In various embodiments, the susceptor may further comprise through-holes (not shown) for which lift pins (not shown) may be disposed within.

The system 100 may further comprise a valve manifold 112 to deliver various precursors and/or reactants to the processing chamber via the showerhead assembly. In various embodiments, the valve manifold 112 may be positioned on the top surface of the showerhead assembly.

The system 100 may further comprise a source vessel 105 configured to contain a chemistry (e.g., a precursor or reactant) to be delivered to the reaction chamber 115 during substrate processing. For example, the source vessel 105 may comprise an interior volume 123 defined by sidewalls 126, a bottom surface 121, and a top surface 124 (e.g., a lid), wherein the sidewalls 126 extend upwards from the bottom surface 121 to the top surface 124. The chemistry may be either a solid or a liquid. The source vessel 105 may configured to be refilled periodically or when the chemistry reaches a predetermined level inside the source vessel 105. In some cases, the source vessel 105 is not removed from its physical location or disconnected from the reaction chamber 115 when it is refilled with new chemistry. In some cases, the chemistry may partially decompose or partially react in the source vessel 105 leaving behind a residue 141 or solute, which can buildup over time. The residue 141 may be observed at the bottom surface 121 of the source vessel 105 and/or on the sidewalls 126 of the source vessel 105.

In various embodiments, the source vessel 105 may comprise a first inlet port comprising a first valve 145, a second inlet port comprising a second valve 150, a first outlet port comprising a third valve 152, a second outlet port comprising a fourth valve 155, and a third outlet port comprising a fifth valve 160. In an exemplary embodiment, the first valve 145 may comprise a high-temperature diaphragm valve, the second valve 150 may comprise a high-speed, high-temperature diaphragm valve, the third valve 152 may comprise a high-temperature diaphragm valve, the fourth valve 155 may comprise a high-speed, high-temperature diaphragm valve, and the fifth valve 160 may comprise a high-temperature diaphragm valve. In an exemplary embodiment, the second outlet port and fourth valve 155 may be used to connect the source vessel 105 to the reaction chamber 115 during wafer processing. In various embodiments, each of the inlet and outlet ports may further comprise various fittings, connectors, and tubing. In an exemplary embodiment, the inlet and outlet ports, including the respective valves, are disposed at the top surface 124 and exterior to the interior volume 123 of the source vessel 105. Alternatively, a portion of the inlet and outlet ports may extend through the top surface 124 and into the interior volume 123. In such a case, however, the respective valves are disposed exterior to the interior volume 123.

In various embodiments, the source vessel 105 may further comprise a first inlet tube 147 connected to the first inlet port and configured to flow a liquid therethrough. The first inlet tube 147 may extend downwards into the interior volume 123 of the source vessel 105 from the top surface 124 towards the bottom surface 121. For example, the first inlet tube 147 may end near the bottom surface 121. Alternatively, the first inlet tube 147 may extend partially (e.g., half way or ¾ of the way) through the interior volume 123.

In various embodiments, the source vessel 105 may further comprise a first outlet tube 146 connected to the third outlet port and configured to flow a liquid therethrough. The first outlet tube 146 may extend downwards into the interior volume 123 of the source vessel 105 from the top surface 124 towards the bottom surface 121. In various embodiments, the first outlet tube 146 may end near the bottom surface 121.

In various embodiments, the first inlet tube 147 may comprise a plurality of nozzles 149 arranged at the end of the inlet tube 147. The plurality of nozzles 149 may comprise any number of nozzles 149 and the nozzles may be pointing in any direction, such as downwards or sideways.

In various embodiments, the system 100 may further comprise a precursor source 122 that contains the chemistry that is used during wafer processing. Additionally, the system 100 may further comprise a solvent source 120 that contains a liquid solvent. In some instances, the liquid solvent may be used to dissolve the residue 141 in the source vessel 105 to create a solution 107.

In one embodiment, the precursor source 122 and the solvent source 120 may be connected to the first valve 145 via a switching manifold 151. The switching manifold 151 may be configured to allow either the precursor chemistry or the liquid solvent to flow to the first valve 145 at any given time. In other words, the switching manifold 151 prevents both the precursor chemistry and the liquid from flowing to the first valve 145 at the same time. Alternatively, the solvent source 120 and the precursor source 122 may be connected to the source vessel 105 with separate lines and valves.

In various embodiments, the system 100 may further comprise a radical generator 125, such as a remote plasma unit or an ozone generator. The radical generator 125 may be configured to generate fluorine radicals. The radical generator 125 may be connected to the source vessel 105 via the second valve 150.

In various embodiments, the source vessel 105 may be heated by an external heat source (not shown), such as heater jackets that surround the outside of the source vessel 105 or an oven style heating wherein the source vessel 105 is contained within a heated environment. In some cases, the chemistry is heated to form a vapor that is flowed to the reaction chamber 115 during substrate processing.

In various embodiments, the system 100 may further comprise a waste vessel 110. The waste vessel 110 may be fluidly connected to the source vessel 105. For example, the waste vessel 110 may be connected downstream from the fifth valve 160 of the third outlet port. The waste vessel 110 may be configured to contain a fluid. For example, the waste vessel 110 may comprise an interior volume 164 defined by sidewalls 162, a top surface 161, and a bottom surface 163.

In various embodiment, the waste vessel 110 may comprise a third inlet port and a second inlet tube 167. The second inlet tube 167 may be connected to the third inlet port and extend into the interior volume 164 of the waste vessel 110. In various embodiments, the third inlet port may comprise a ninth valve 165. The ninth valve 165 may comprise a diaphragm valve. In various embodiments, the third inlet port may be disposed at the top surface 161 of the waste vessel 110.

In various embodiments, the waste vessel 110 may further comprise a second outlet port disposed at the bottom surface 163 of the waste vessel. The second outlet port may be configured to selectively flow liquid out of the waste vessel 110. For example, the second outlet port may comprise a sixth valve 185.

In various embodiments, the waste vessel 110 may further comprise a mechanism 140 disposed within the interior volume 164 of the waste vessel 110 that is configured to expand and contract. For example, the mechanism 140 may comprise a bellow or a bladder.

Additionally, or alternatively, the system 100 may further comprise a liquid pump 300 fluidly connected downstream from the sixth valve 185. The liquid pump 300 may comprise any pump suitable for pumping a liquid from the waste vessel 110.

In various embodiments, the waste vessel 110 may further comprise a fourth inlet port comprising a seventh valve 180 and a fifth inlet port comprising an eighth valve 170. The seventh and eighth valves 180, 170 may comprise a diaphragm valve or a solenoid valve. In various embodiments, the fourth and fifth inlet ports may be disposed at the top surface 161 of the waste vessel 110. The seventh valve 180 may be connected to a vacuum source 135 and the eighth valve 170 may be connected to an pressurized air source 130 that has a pressure higher than that of the interior volume 164 to expand the mechanism 140. In various embodiments, the vacuum source 135 may be connected to the mechanism 140 and arranged to remove air from the mechanism 140. In other embodiments, the vacuum source 135 may be connected to the waste vessel 110 via a vacuum pathway and arranged to remove air from the interior volume 164 of the waste vessel 110, such as in a case where the liquid pump 300 is used without the bellow or bladder mechanism 140.

In various embodiments, the valves 145, 150, 152, 155, 160, 161, 165, 170, 180 may comprise any suitable valve for selectively controlling flow of gas or liquid. For example, the valves may comprise a pneumatic valve, a diaphragm valve, a plug valve, a piston valve, and the like.

In various embodiments, the system 100 may further comprise a particle counter 171 configured to measure particulate matter concentrations or otherwise detect particulate matter in a liquid. For example, the particle counter 171 may be configured to detect or measure the particular matter of the residue 141. In one embodiment, the particle counter 171 may be disposed downstream from the fifth valve 160 and upstream from the second inlet tube 167. Alternatively, the particle counter 171 may be disposed downstream from the sixth valve 185.

In various embodiments, the system 100 may further comprise one or more sensors (not shown) to detect or otherwise measure the level of processing chemistry or the solution 107. The sensor may be any suitable sensor type for measuring or detecting a liquid and/or a solid. For example, the sensor may comprise a liquid sensor, a capacitive sensor, force sensor, ultrasonic sensor, a floating sensor, and the like.

In operation, and referring to FIGS. 1-4, the system 100 may be configured to process a wafer using the chemistry from the precursor source 122. Initially, the source vessel 105 is filled with the processing chemistry from the precursor source 122 (400). This may be achieved by operating the switching manifold 151 and first valve 145 to allow the chemistry from the precursor source 122 to flow into the source vessel 105. For example, the switching manifold 151 may be operated to block the flow of the liquid solvent in the solvent source 120 and pass the chemistry in the precursor source 122, and the first valve 145 may be opened. Once the source vessel 105 is filled with the processing chemistry, wafer processing may proceed (405). This process of refilling the source vessel 105 with processing chemistry and performing wafer processing may occur a number of times.

In some cases, the processing chemistry may partially decompose or partially react inside of the source vessel 105 resulting in the buildup of the residue 141 (i.e., impurities) at the bottom surface 121 and/or on the sidewalls 126. Buildup of impurities in the source vessel 105 can result in dose variation or defect issues during wafer processing.

In various embodiments, after a predetermined number of wafer processing and filling the source vessel 105 with processing chemistry, the sensor (not shown) may be used to detect when the processing chemistry is low or empty (410).

In various embodiments, the system 100 may perform an ashing process (415), wherein a fluorine radical is generated and introduced into the source vessel 105 to react with any metalloorganic residue to form a metal fluoride or oxide solids and volatile organic species. The residues formed as a result of the ashing process may be removed by cleaning method, as described below.

Embodiments of the present technology may comprise a method of cleaning the residue 141 from the source vessel 105 after the wafer processing operation. In an exemplary embodiment, the cleaning process may proceed once the system 100 detects that the source vessel 105 is low on processing chemistry or empty. The cleaning process may comprise filling the source vessel 105 with the liquid solute to dissolve any residue 141 and form the solution 107 (420). This may be achieved by operating the switching manifold 151 and first valve 145 to allow the liquid solvent from the solvent source 120 to flow into the source vessel 105 via the first inlet tube 147. For example, the switching manifold 151 may be operated to block the flow of the processing chemistry in the precursor source 122 and pass the liquid solvent, and the first valve 145 may be opened. The method of cleaning may comprise filling the source vessel 105 with the liquid solvent until it reaches a predetermined level (e.g., as indicated by a sensor) in the source vessel 105 or until a predetermined volume of liquid solvent has been transferred to the source vessel 105 (e.g., as indicated by a flow meter or the like).

In various embodiments, the method of cleaning may further comprise transferring the solution from the source vessel 105 to the waste vessel 110 (425). In one embodiment, transferring the solution may comprise opening the fifth valve 160, flowing the solution through the first outlet tube 146 and into the waste vessel 110 via the second inlet tube 167. In cases where the system 100 comprises the nineth valve 165, the nineth valve 165 may also be open. In addition, and in cases where the precursor source 122 and the solvent source 120 share the same inlet, the switching manifold 151 may be operated to block the flow of the chemistry in the precursor source 122 and pass the liquid solvent in the solvent source 120.

In an exemplary embodiment, and referring to FIGS. 1 and 2, flowing the solution from the source vessel 105 to the waste vessel 110 may be facilitated by contracting the bellow or balloon mechanism 140. Contracting the mechanism 140 may comprise activating the vacuum source 135 to remove air from the mechanism 140. Additionally, the sixth valve 185 will be closed. With the sixth valve 185 closed and contracting the mechanism 140 with the sixth valve 185 closed will create a negative pressure inside the waste vessel 110. The negative pressure created in the waste vessel 110 will flow the solution from the source vessel 105 to the waste vessel 110.

In various embodiments, the method for cleaning may further comprise draining the solution from the waste vessel 110 (430). This may be achieved by pumping or otherwise forcing the solution out of the waste vessel 110. In one embodiment, and referring to FIGS. 1 and 2, draining the solution from the waste vessel 110 may comprise expanding the mechanism 140 and opening the sixth valve 185 to force the solution out of the waste vessel 110 through the second outlet port and sixth valve 185. Expanding the mechanism may comprise pressurizing the mechanism 140 by opening the eighth valve 170 and flowing air into the mechanism 140. The vacuum pathway may be closed by closing the seventh valve 180.

In another embodiment, and referring to FIG. 3, flowing the solution from the source vessel 105 to the waste vessel 110 may be facilitated by opening the seventh valve 180 to evacuate the air from the waste vessel 110 and create a negative pressure in the waste vessel 110. The negative pressure will draw the solution from the source vessel 105 to the waste vessel 110 (i.e., the interior volume 164 is lower pressure than the source vessel 105). The waste vessel 110 may then be drained by turning off the seventh valve 180, opening the sixth valve 185, and turning on the liquid pump 300.

In various embodiments, steps 420, 425, and 430 may be repeated a predetermined number of times or any number of times needed to dissolve all or most of the residue 141 from the source vessel 105. The particle counter 171 may be used to indicate how many cycles are needed. For example, the system 100 may repeat 420, 425, and 430 until the particle counter 171 no longer detects solid particulate matter or the concentration of the particulate matter in the solution is at or below a preset threshold level.

In various embodiments, the method for cleaning may further comprise performing an ashing process (415) prior to filling the source vessel 105 with the solute (420). The ashing process may comprise generating a fluorine radical and introducing it into the source vessel 105 to react with any metalloorganic residue to form a metal fluoride or oxide solids and volatile organic species. For example, the radical generator 125 may be used to generate the fluorine radical. The residues formed as a result of the ashing process (415) may be removed by the cleaning method, as described above in steps 420, 425, and 430.

In various embodiments, once the cleaning process is complete (e.g., steps 415, 420, 425, and 430), the method may further comprise drying the source vessel 105. Drying the source vessel 105 may comprise heating the source vessel 105 and/or evacuating air from the source vessel 105 by opening the vacuum pathway, for example by opening the third valve 152.

In various embodiments, once the cleaning process is complete (e.g., steps 415, 420, 425, and 430), the system 100 may return to the wafer processing operation by returning to step 400.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

What is claimed is:

1. A method for cleaning a source vessel containing a solute, comprising:

flowing a solvent into the source vessel via a first inlet tube;

filling the source vessel with the solvent to a predetermined level;

forming a solution from the solvent and the solute;

providing a waste vessel connected to the source vessel;

flowing the solution from the source vessel to the waste vessel, comprising generating a negative pressure in the waste vessel, wherein the generating the negative pressure in the waste vessel comprises compressing a bellow disposed inside of the waste vessel via a vacuum source; and draining the solution from the waste vessel.

2. The method according to claim 1, further comprising detecting particulate matter of the solute in the solution.

3. The method according to claim 1, wherein the draining the solution from the waste vessel comprises expanding the bellow by pressurizing the bellow.

4. The method according to claim 1, further comprising drying the source vessel comprising heating the source vessel and evacuating air in the source vessel.

5. The method according to claim 1, further comprising:

maintaining the source vessel at a first temperature; and maintaining the waste vessel at a second temperature, wherein the second temperature is less than the first temperature.

6. The method according to claim 1, further comprising introducing a fluorine radical into the source vessel prior to the flowing the solvent into the source vessel.

7. A method for cleaning a source vessel containing a solute, comprising:

flowing a solvent into the source vessel via a first inlet tube;

maintaining the source vessel at a first temperature;

filling the source vessel with the solvent to a predetermined level;

forming a solution from the solvent and the solute;

providing a waste vessel connected to the source vessel;

maintaining the waste vessel at a second temperature, wherein the second temperature is less than the first temperature;

flowing the solution from the source vessel to the waste vessel, comprising generating a negative pressure in the waste vessel; and draining the solution from the waste vessel.

8. The method according to claim 7, further comprising detecting particulate matter of the solute in the solution.

9. The method according to claim 7, wherein the generating the negative pressure in the waste vessel comprises compressing a bellow disposed inside of the waste vessel via a vacuum source.

10. The method according to claim 9, wherein the draining the solution from the waste vessel comprises expanding the bellow by pressurizing the bellow.

11. The method according to claim 7, further comprising drying the source vessel comprising heating the source vessel and evacuating air in the source vessel.

12. The method according to claim 7, further comprising introducing a fluorine radical into the source vessel prior to the flowing the solvent into the source vessel.

13. A method for cleaning a source vessel containing a solute, comprising:

introducing a fluorine radical into the source vessel;

flowing a solvent into the source vessel via a first inlet tube after the introducing the fluorine radical into the source vessel;

filling the source vessel with the solvent to a predetermined level;

forming a solution from the solvent and the solute;

providing a waste vessel connected to the source vessel;

flowing the solution from the source vessel to the waste vessel, comprising generating a negative pressure in the waste vessel; and draining the solution from the waste vessel.

14. The method according to claim 13, further comprising detecting particulate matter of the solute in the solution.

15. The method according to claim 13, wherein the generating the negative pressure in the waste vessel comprises compressing a bellow disposed inside of the waste vessel via a vacuum source.

16. The method according to claim 15, wherein the draining the solution from the waste vessel comprises expanding the bellow by pressurizing the bellow.

17. The method according to claim 13, further comprising drying the source vessel comprising heating the source vessel and evacuating air in the source vessel.

18. The method according to claim 13, further comprising:

maintaining the source vessel at a first temperature; and maintaining the waste vessel at a second temperature, wherein the second temperature is less than the first temperature.

* * * * *